US007039584B2

(12) United States Patent
Gournay et al.

(10) Patent No.: US 7,039,584 B2
(45) Date of Patent: May 2, 2006

(54) METHOD FOR THE ENCODING OF PROSODY FOR A SPEECH ENCODER WORKING AT VERY LOW BIT RATES

(75) Inventors: Philippe Gournay, Asnieres (FR); Yves-Paul Nakache, Morsang sur Orge (FR)

(73) Assignee: Thales, Paris (FR)

( * ) Notice: Subject to any disclaimer, the term of this patent is extended or adjusted under 35 U.S.C. 154(b) by 466 days.

(21) Appl. No.: 09/978,680

(22) Filed: Oct. 18, 2001

(65) Prior Publication Data

US 2002/0065655 A1 May 30, 2002

(30) Foreign Application Priority Data

Oct. 18, 2000 (FR) .................................. 00 13628

(51) Int. Cl.
*G10L 19/12* (2006.01)
*G10L 11/04* (2006.01)
*G10L 15/04* (2006.01)

(52) U.S. Cl. ....................... 704/221; 704/207; 704/254

(58) Field of Classification Search ................ 704/214, 704/207, 208
See application file for complete search history.

(56) References Cited

U.S. PATENT DOCUMENTS

| | | | | | |
|---|---|---|---|---|---|
| 4,802,223 | A | * | 1/1989 | Lin et al. | 704/207 |
| 5,305,421 | A | * | 4/1994 | Li | 704/219 |
| 5,682,464 | A | * | 10/1997 | Sejnoha | 704/238 |
| 5,745,871 | A | * | 4/1998 | Chen | 704/207 |
| 5,832,425 | A | * | 11/1998 | Mead | 704/221 |
| 5,933,805 | A | | 8/1999 | Boss et al. | |
| 6,161,091 | A | * | 12/2000 | Akamine et al. | 704/258 |
| 6,408,273 | B1 | * | 6/2002 | Quagliaro et al. | 704/271 |
| 6,456,965 | B1 | * | 9/2002 | Yeldener | 704/207 |
| 6,687,667 | B1 | * | 2/2004 | Gournay et al. | 704/222 |
| 2002/0029140 | A1 | * | 3/2002 | Ozawa | 704/219 |
| 2002/0152073 | A1 | * | 10/2002 | DeMoortel et al. | 704/260 |

OTHER PUBLICATIONS

Cernocky, Jan. "Speech Processing Using Automatically Derived Segmental Units: Applications to Very Low Rate Coding and Speaker Verification", PhD Thesis, Dec. 18, 1998.*

Tokuda, K. Masuko, T. Hiroi, J. Kobayashi, T. Kitamura, T. "A very low bit rate speech coder using HMM-based speech recognition/synthesis techniques" Acoustics, Speech and Signal Processings May 1998, vol. 2, pp. 609-612.*

(Continued)

*Primary Examiner*—W. R. Young
*Assistant Examiner*—Matthew J Sked
(74) *Attorney, Agent, or Firm*—Oblon, Spivak, McClelland, Maier & Neustadt, P.C.

(57) ABSTRACT

A speech encoding/decoding method using an encoder working at very low bit rates, comprises a learning step enabling the identification of the representatives of the speech signal; and an encoding step to segment the speech signal and determine the best representative associated with each recognized segment. The method also comprises at least one step for the encoding/decoding of at least one of the parameters of the prosody of the recognized segments, e.g., the energy, pitch, voicing, and/or length of the segments, by using a piece of information on prosody pertaining to the best representatives. The method can employ a bit rate of lower than 400 bits per second.

12 Claims, 4 Drawing Sheets

OTHER PUBLICATIONS

Felici, M. Borgatti, M. Guerrieri, R. "Very low bit rate speech coding using diphone-based recognition and synthesis approach" Electronics Letters Apr. 1998, vol. 34, pp. 859-860.*
Yves-Paul Nakache, et al. "Codage de la prosodie pour un codeur de parole a tres bas debit par indexation d'unites de taille variable", CORESA' 2000, Oct. 19-20, 2000, 2 pages.
M. Felici, et al. "Very low bit rate speech coding using a diphone-based recognition and synthesis approach", Electronics Letters, IEE Stevenage, GB, vol. 34, No. 9, Apr. 30, 1998, pp. 859-860.
Ki-Seung Lee,, et al. "TTS Based Very Low Bit Rate Speech Coder", Phoenix, AZ, Mar. 15-19, 1999, New York, NY: IEEE, US, Mar. 15, 1999, pp. 181-184.
Jan Cernocky, et al. "Very Low Bit Rate Speech Coding: Comparison of Data-Driven Units with Syllable Segments", Text, Speech, and Dialogue, Second International Workshop, TDS '99. Proceedings (Lecture Notes in Artificial Intelligence vol. 1692), PLZEN, Czech Republic, Sep. 13-17, 1999, pp. 262-267.
Genevieve Baudoin, et al. "Speech coding at low and very low bit rate", Annales Des Telecommunications, Sep.-Oct. 2000, Editions Hermes, France, vol. 55, No. 9-10, pp. 462-482.
B. Mouy, et al., "Nato Stanag 4479: A Standard for an 800 bps Vocoder and Channel Coding in HF-ECCM system", IEEE Int. Conf. on ASSP, Detroit, pp. 480-483, May 1995.
T. Tremain, "The Government Standard Linear Predictive Coding Algorithm: LPC-10", published in the journal Speech Technology, vol. 1, No. 2, pp. 40-49.

* cited by examiner

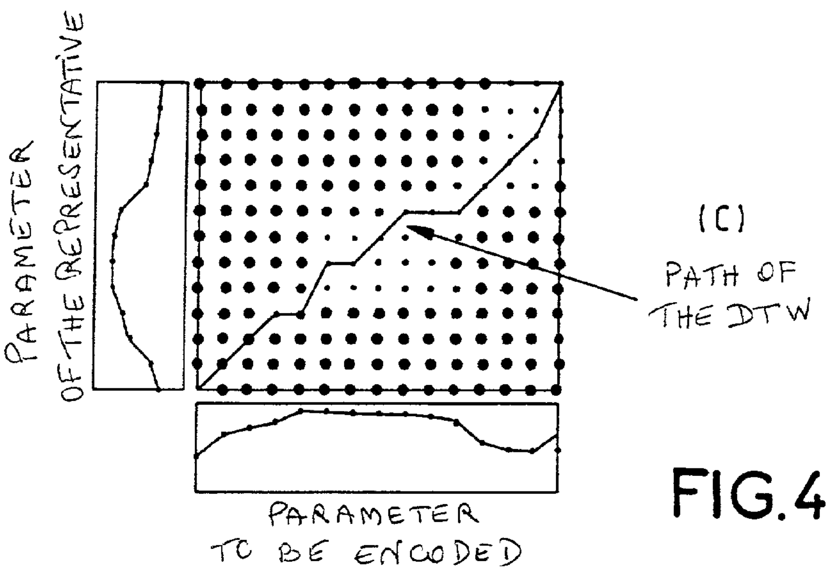
FIG. 4
FIG. 5
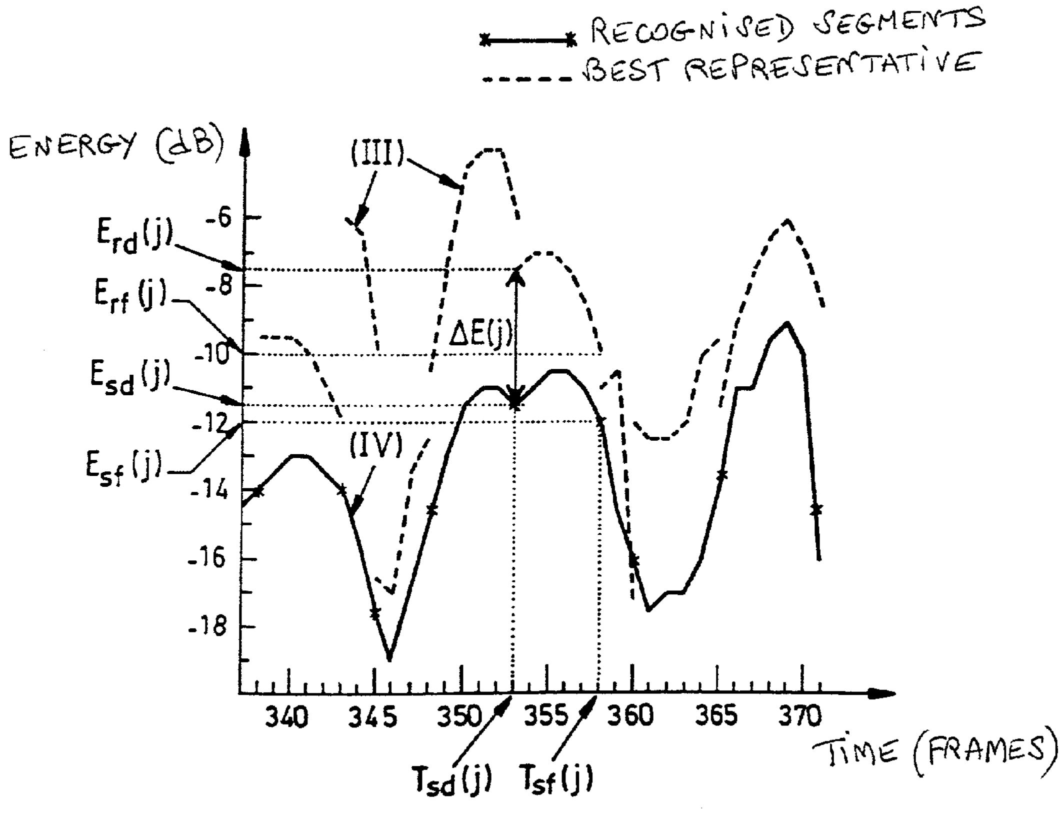

METHOD FOR THE ENCODING OF PROSODY FOR A SPEECH ENCODER WORKING AT VERY LOW BIT RATES

BACKGROUND OF THE INVENTION

1. Field of the Invention

The present invention relates to a method for the encoding of speech at very low bit rates and to an associated system. It can be applied especially to systems of speech encoding/decoding by the indexing of variably sized units.

The speech encoding method implemented at low bit rates, for example at a bit rate of about 2400 bits/s, is generally that of the vocoder using a wholly parametrical model of speech signals. The parameters used relate to voicing which describes the periodic or random character of the signal, the fundamental frequency or "pitch" of the voiced sounds, the temporal evolution of the energy values as well as the spectral envelope of the signal generally modelled by an LPC (linear predictive coding) filter.

These different parameters are estimated periodically on the speech signal, typically every 10 to 30 ms. They are prepared in an analysis device and are generally transmitted remotely towards a synthesizing device that reproduces the speech signal from the quantified value of the parameters of the model.

2. Description of the Prior Art

Hitherto, the lowest standardized bit rate for a speech encoder using this technique has been 800 bits/s. This encoder, standardized in 1994, is described in the NATO STANAG 4479 standard and in an article by B. Mouy, P. De La Noue and G. Goudezeune, "NATO STANAG 4479: A Standard for an 800 bps Vocoder and Channel Coding in HF-ECCM system", IEEE Int. Conf. on ASSP, Detroit, pp. 480–483, May 1995. It relies on an LPC 10 type technique of frame-by-frame (22.5 ms) analysis and makes maximum use of the temporal redundancy of the speech signal by grouping the frames in sets of three before encoding the parameters.

Although it is intelligible, the speech reproduced by these encoding techniques is of fairly poor quality and is not acceptable once the bit rate goes below 600 bits/s.

One way to reduce the bit rate is to use phonetic type segmental vocoders with variable-time segments that combine the principles of speech recognition and synthesis.

The encoding method essentially uses a system of automatic recognition of speech in continuous flows. This system segments and "labels" the speech signal according to a number of variably-sized speech units. These phonetic units are encoded by indexing in a small dictionary. The decoding relies on the principle of speech synthesis by concatenation on the basis of the index of the phonetic units and on the basis of the prosody. The term "prosody" encompasses mainly the following parameters: the energy of the signal, the pitch, a piece of voicing information and, as the case may be, the temporal rhythm.

However, the development of phonetic encoders requires substantial knowledge of phonetics and linguistics as well as a phase of phonetic transcription of a learning database that is costly and may be a source of error. Furthermore, phonetic encoders have difficulty in adapting to a new language or a new speaker.

Another technique described for example in the thesis by J. Cernocky, "Speech Processing Using Automatically Derived Segmental Units: Applications to Very Low Rate Coding and Speaker Verification", University of Paris XI Orsay, December 1998, gets around the problems related to the phonetic transcription of the learning database by determining the speech units automatically and independently of language.

The working of this type of decoder can be subdivided chiefly into two steps: a learning step and an encoding/decoding step described in FIG. 1.

During the learning step (FIG. 1), an automatic procedure, for example after a parametrical analysis 1 and a segmentation step 2, determines a set of 64 classes of acoustic units designated "AU". With each of these classes of acoustic units, there is associated a statistical model 3, which is a model of the Markov (or HMM, namely Hidden Markov Model) type, as well as a small number of units representing a class known as "representatives" 4. In the present system, the representatives are simply the eight longest units belonging to one and the same acoustic class. They may also be determined as being the N most representative units of the acoustic unit. During the encoding of a speech signal after a step of parametrical analysis 5 used to obtain especially the spectral parameters, the energy values, the pitch, a recognition procedure (6, 7) using a Viterbi algorithm determines the succession of acoustic units of the speech signal and identifies the "best representative" to be used for the speech synthesis. This choice is done for example by using a spectral distance criterion such as the DTW (dynamic time warping) algorithm.

The number of the acoustic class, the index of this representative unit, the length of the segment, the contents of the DTW and the prosody information derived from the parametrical analysis are transmitted to the decoder. The speech synthesis is done by concatenation of the best representatives, possibly by using an LPC type parametrical synthesizer.

To concatenate the representatives during the speech decoding, one method used is, for example, a method of parametrical speech analysis/synthesis. This parametrical method enables especially modifications of prosody such as temporal evolution, the fundamental frequency or pitch as compared with a simple concatenation of waveforms.

The parametrical speech model used by the method of analysis/synthesis may be a voiced/non-voiced binary excitation of the LPC 10 type as described in the document by T. Tremain, "The Government Standard Linear Predictive Coding Algorithm: LPC-10", published in the journal Speech Technology, Vol. 1, No. 2, pp. 40–49.

This technique encodes the spectral envelope of the signal in 185 bits/s approximately for a monospeaker system, for an average of about 21 segments per second.

Hereinafter in the description, the following terms have the following meanings:

- the term "representative" corresponds to one of the segments of the learning base which has been judged to be representative of one of the classes of acoustic units,
- the expression "recognized segment" corresponds to a speech segment that has been identified as belonging to one of the acoustic classes, by the encoder,
- the expression "best representative" designates the representative determined at the encoding that best represents the recognized segment.

SUMMARY OF THE INVENTION

The object of the present invention relates to a method for the encoding and decoding of prosody for a speech encoder working at very low bit rates, using especially the best representatives.

It also relates to data compression.

The invention relates to a speech encoding/decoding method using an encoder working at very low bit rates, comprising a learning step enabling the identification of the "representatives" of the speech signal and an encoding step to segment the speech signal and determine the "best representative" associated with each recognized segment. The method comprises at least one step for the encoding/decoding of at least one of the parameters of the prosody of the recognized segments, such as the energy and/or pitch and/or voicing and/or length of the segments, by using a piece of information on prosody pertaining to the "best representatives".

The information on prosody of the representatives that is used is for example the energy contour or the voicing or the length of the segments or the pitch.

The step of encoding the length of the recognized segments consists for example in encoding the difference in length between the length of a recognized segment and the length of the "best representative" multiplied by a given factor.

According to one embodiment, the invention comprises a step for the encoding of the temporal alignment of the best representatives by using the DTW path and searching for the nearest neighbor in a table of shapes.

The energy encoding step may comprise a step for the determining, for each start of a recognized segment, of the difference $\Delta E(j)$ between an energy value $E_{rd}(j)$ of the "best representative" and the energy value $E_{sd}(j)$ of the start of the "recognized segment". The decoding step may comprise, for each recognized segment, a first step consisting in translating the energy contour of the best representative by a quantity $\Delta E(j)$ to make the first energy value $E_{rd}(j)$ of the "best representative" coincide with the first energy value $E_{sd}(j+1)$ of the recognized segment having an index j+1.

The voicing encoding step comprises for example a step for determining the existing differences $\Delta T_k$ for each end of a voicing zone with an index k between the voicing curve of the recognized segments and that of the best representatives. The decoding step comprises for example, for each end of a voicing zone with an index k, a step of correction of the temporal position of this end by a corresponding value $\Delta T_k$ and/or a step for the elimination or the insertion of a transition.

The method also relates to a speech encoding/decoding system comprising at least one memory to store a dictionary comprising a set of representatives of the speech signal, a microprocessor adapted to determining the recognized segments, reconstructing the speech from the "best representatives" and implementing the steps of the method according to one of the above-mentioned characteristics.

The dictionary of the representatives is for example common to the encoder and to the decoder of the encoding/decoding system.

The method and the system according to the invention may be used for the encoding/decoding of the speech for bit rates lower than 800 bits/s and preferably lower than 400 bits/s.

The encoding/decoding method and the system according to the invention especially offer the advantage of encoding prosody at very low bit rates and thus providing a complete encoder in this field of application.

BRIEF DESCRIPTION OF THE DRAWINGS

Other features and advantages shall appear from the following detailed description of an embodiment given by way of a non-restrictive example and illustrated by the appended figures, of which:

FIGS. 5 and 6 show curves of energy values of the signal to be encoded and of the aligned representatives as well as contours of the initial and decoded energy values obtained in implementing the method according to the invention, FIG. 7 gives a schematic view of the encoding of the voicing of the speech signal.

DETAILED DESCRIPTION OF THE PREFERRED EMBODIMENTS

The principle of encoding according to the invention relies on the use of the "best representatives", especially their information on prosody, for encoding and/or decoding at least one of the parameters of prosody of a speech signal, for example the pitch, the energy of the signal, the voicing, the length of the recognized segments.

To compress the prosody at very low bit rates, the principle implemented uses the segmentation of the encoder as well as the prosodic information pertaining to the "best representatives".

Figure 1:
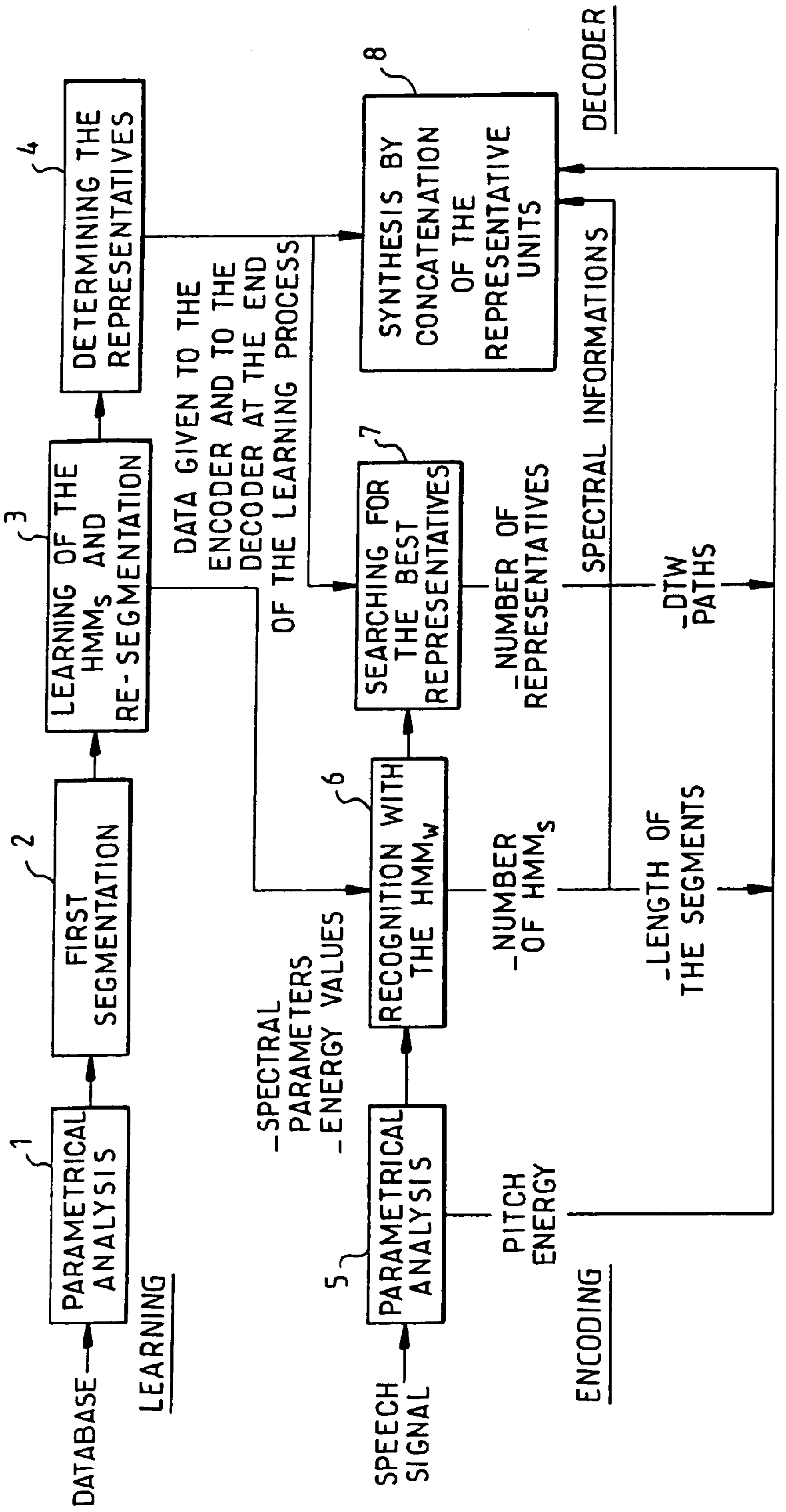
FIG.1 BACKGROUND ART
FIG. 1 is a diagram that shows the steps of learning, encoding and decoding of speech according to the prior art, FIGS. 2 and 3 describe examples of encoding of the length of recognized segments, FIG. 4 gives a schematic view of a model of temporal alignment of the "best representatives"

The following description, which is given by way of an illustration that in no way restricts the scope of the invention, describes a method for the encoding of prosody in a speech encoding/decoding device working at low bit rates that comprises a dictionary obtained automatically, for example during the learning process as described in FIG. 1.

The dictionary comprises the following information:

several classes of acoustic units AU, each class being determined from a statistical model, for each class of acoustic units, a set of representatives.

This dictionary is known to the encoder and the decoder. It corresponds for example to one or more languages and to or more speakers.

The encoding/decoding system comprises for example a memory to store the dictionary, a microprocessor adapted to determining the recognized segments for the implementation of the different steps of the method according to the invention and adapted to reconstructing speech from the best representatives.

The method according to the invention implements at least one of the following steps: the encoding of the length of the segments, the encoding of the temporal alignment of the "best representatives", the encoding and/or the decoding of the energy, the encoding and/or decoding of the voicing information and/or the encoding and/or the decoding of the pitch and/or the decoding of the length of the segments and of the temporal alignment.

Encoding of the Length of the Segments

The encoding system determines, on an average, a number Ns of segments per second, for example 21 segments. The size of these segments varies as a function of the class of acoustic units AU. It can be seen that, for the majority of the AUs, the number of segments decreases according to a relationship $1/x^{2.6}$, where x is the length of the segment.

Figure 2:
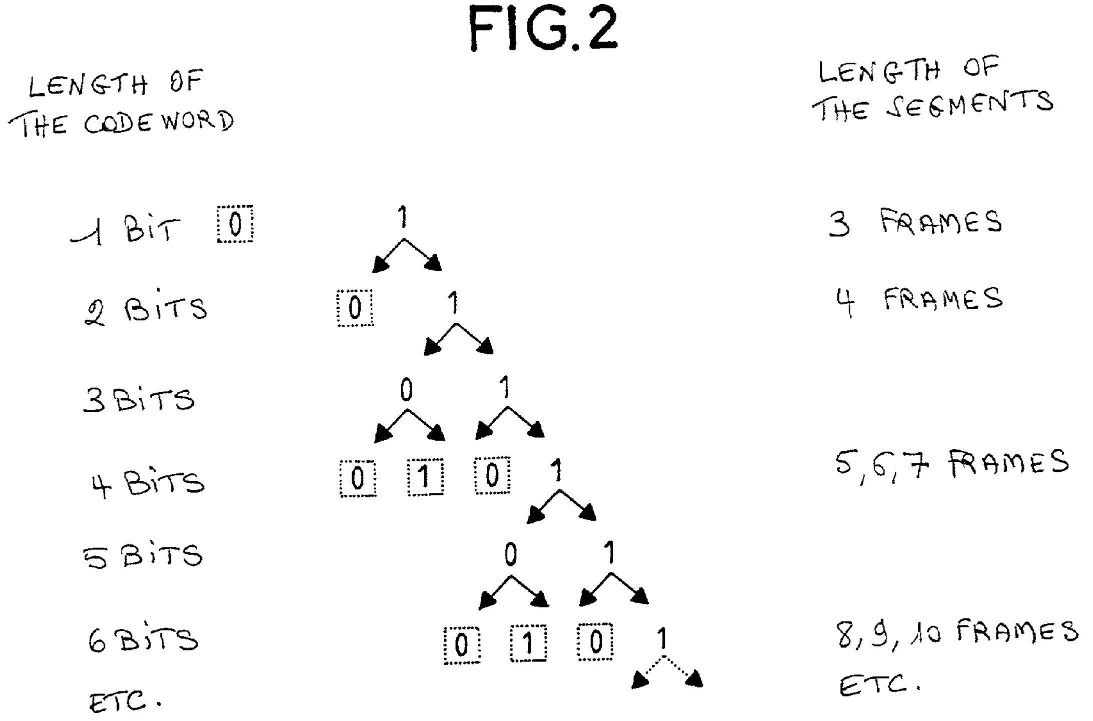

An alternative embodiment of the method according to the invention consists in encoding the difference of the variable length between the "recognized segment" and the length of the "best representative" according to the diagram of FIG. 2.

In this drawing, the left-hand column shows the length of the code word to be used and the right-hand column shows the difference in length between the length of the segment recognized by the encoder for the speech signal and that of the best representative.

Figure 3:
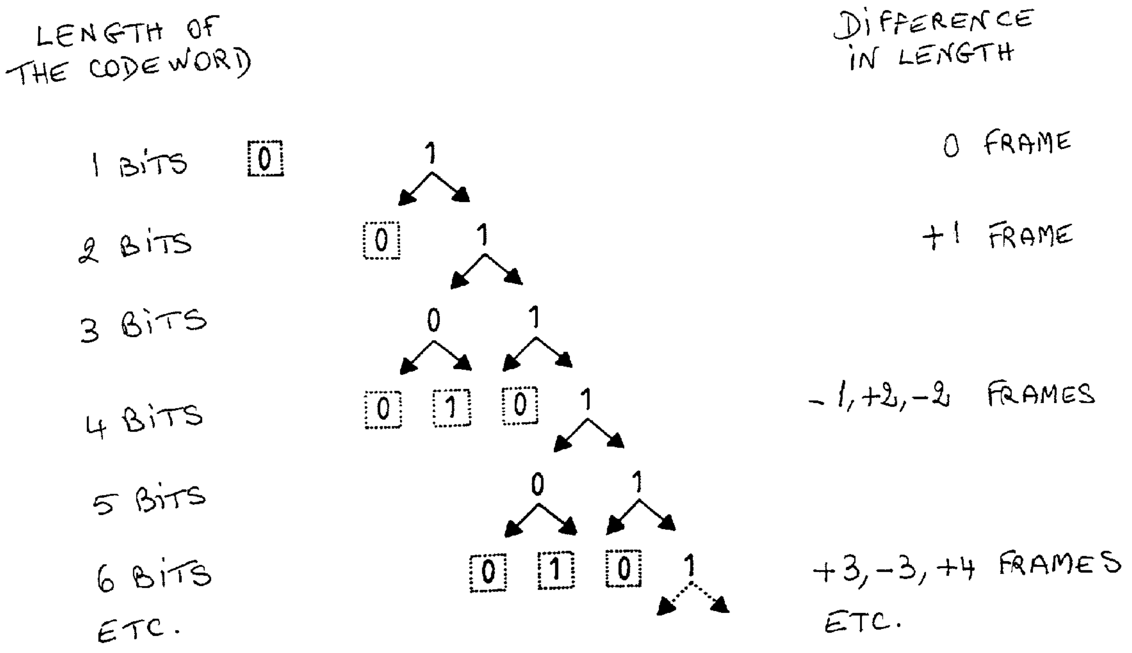

According to another embodiment shown in FIG. 3, the encoding of the absolute length of a recognized segment is done by means of a variable-length code similar to the Huffman code known to those skilled in the art. This can be used to obtain a bit rate of about 55 bits/s.

The fact of using lengthy code words to encode the lengths of recognized big segments makes it possible especially to keep the bit rate value within a limited range of variation. Indeed, these long segments reduce the number of recognized segments per second and the number of lengths to be encoded.

In short, a variable-length code for example is used to encode the difference between the length of the segment recognized and the length of the best representative multiplied by a certain factor, this factor possibly ranging between 0 (absolute encoding) and 1 (encoding of the difference).

Encoding of the Temporal Aligment of the Best Representatives

The temporal alignment is obtained for example by following the path of the DTW (dynamic time warping) which has been determined during the search for the "best representative" to encode the "recognized segment".

FIG. 4 shows the path (C) of the DTW corresponding to the temporal contour which minimizes the distortion between the parameter to be encoded (X axis), for example the vector of the "cepstral" coefficients, and the "best representative" (Y axis). This approach is described in Rene Boite and Murat Kunt, "Traitement de la parole" (Speech Processing), Presses Polytechnique Romandes, 1987.

The encoding of the alignment of the "best representatives" is done by searching for the closest neighbor in a table containing type forms. The choice of these type forms is done for example by a statistical approach such as learning on a speech database or by an algebraic approach, for example the description by parametrizable mathematical equations, these different methods being known to those skilled in the art.

According to another approach, which is useful when the proportion of the small-sized segment is great, the segments are aligned along the diagonal rather than on the exact path of the DTW. The bit rate is then zero.

Encoding/decoding of Energy

When the segments of the speech database belonging to each of the classes of acoustic units are classified and analyzed, it is seen that a certain consistency emerges in the shape of the contours of the energy values. Furthermore, there are resemblances between the energy contours of the best representatives aligned by DTW and the energy contours of the signal to be encoded.

The encoding of the energy is described here below with reference to FIGS. 5 and 6 where the Y axis corresponds to the energy of the speech signal to be encoded expressed in dB and the X axis corresponds to the time expressed in frames.

FIG. 5 represents the curve (III) grouping the energy contours of the aligned best representatives and the curve (IV) of the energy contours of the recognized segments separated by asterisks (*) in the figure. A recognized segment having an index j is demarcated by two points having respective coordinates $[E_{sd}(j); T_{sd}(j)]$ and $[E_{sf}(j); T_{sf}(j)]$ where $E_{sd}(j)$ is the energy value of the start of the segment and $E_{sf}(j)$ is the energy value of the end of the segment for the corresponding instants $T_{df}$ and $T_{sf}$. The references $E_{rd}(j)$ and $E_{rf}(j)$ are used for the starting and ending energy values of a "best representative" and the reference $\Delta E(j)$ corresponds to the translation determined for a recognized segment with an index j Encoding of the Energy The method comprises a first step for determining the translation to be achieved.

For this purpose, for each start of a "recognized segment", the method determines the difference $\Delta E(j)$ existing between the energy value $E_{rd}(j)$ of the best representative curve (curve III) and the energy value $E_{sd}$ of the start of the recognized segment (curve IV). A set of values $\Delta E(j)$ is obtained and this set of values is quantified for example uniformly so as to know the translation to be applied during the decoding. The quantification is done for example by using methods known to those skilled in the art.

Decoding of the Energy of the Speech Signal

The method consists especially in using the energy contours of the best representatives (curve III) to reconstruct the energy contours of the signal to be encoded (curve IV).

For each recognized segment, a first step consists in translating the energy contour of the best representative to make it coincide with the first energy $E_{rd}(j)$ by applying to it the translation $\Delta E(j)$ defined in the encoding step for example to determine the value $E_{sd}(j)$. After this first translation step, the method comprises a step of modification of the slope of the energy contour of the best representative in order to link the last energy value $E_{rd}(j)$ of the "best representative" to the first energy value $E_{sd}(j+1)$ of the following segment with an index j+1.

Figure 6:
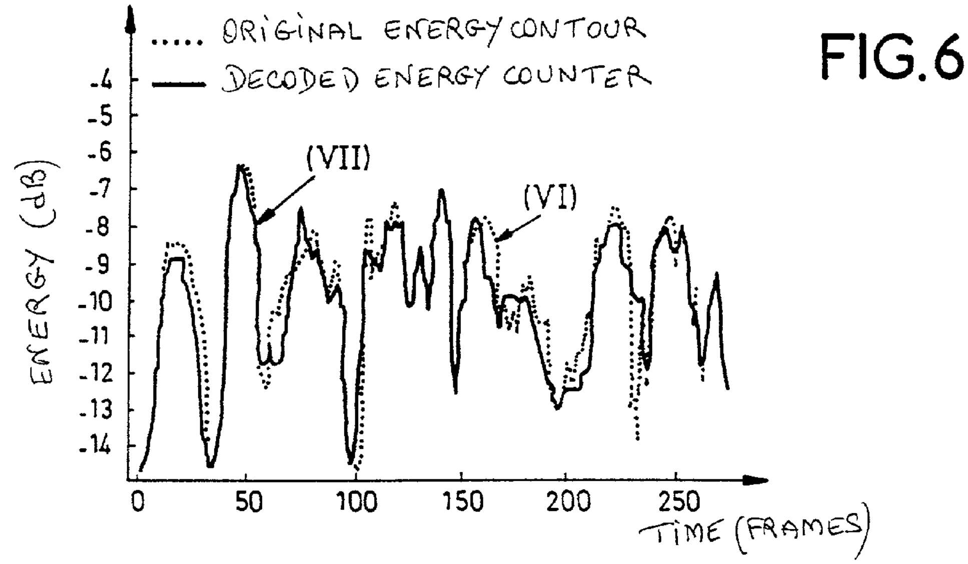

FIG. 6 shows the curves (VI) and (VII) corresponding respectively to the original contour of the speech signal to be encoded and the energy contour decoded after implementation of the step described previously.

For example, the encoding of the energy values of the start of each segment on 4 bits gives a bit rate of about 80 bits/s for the segmental encoding of the energy.

Encoding of the Voicing Information

Figure 7:
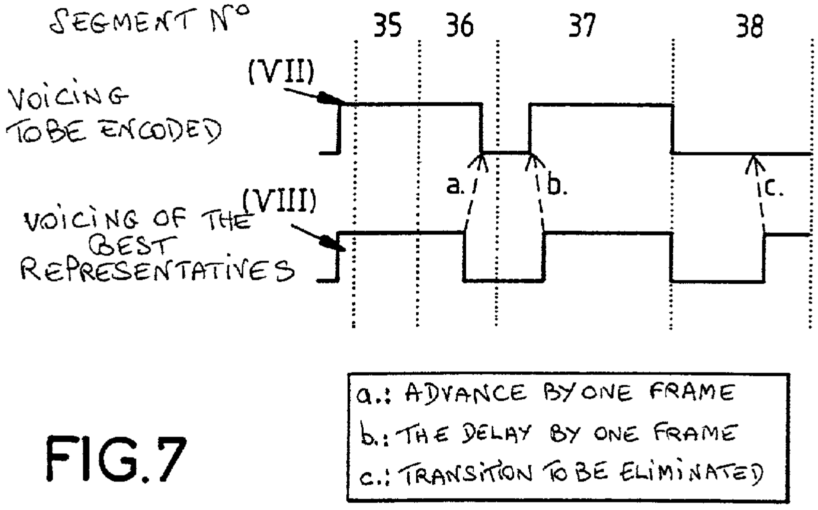
Figure 8:
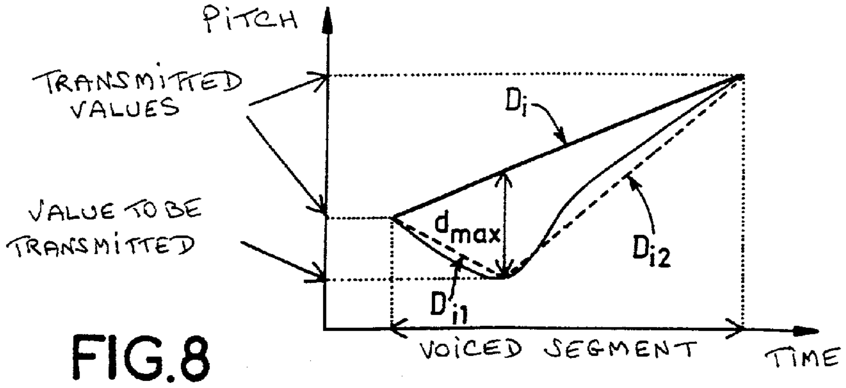
FIG. 8 shows an exemplary encoding of the pitch.

FIG. 7 shows the temporal evolution of a piece of binary voicing information with four successive segments 35, 36, 37 for the signal to be encoded (curve VII) and for the best representatives (curve VIII) after temporal alignment by DTW.

Encoding of the Voicing Information

During the encoding, the method executes a step for the encoding of the voicing information, for example by going through the temporal evolution of the information on the voicing of the recognized segments and that of the aligned best representatives (curve VIII) and by encoding the differences existing $\Delta T_k$ between these two curves. These differences $\Delta T_k$ may be: an advance a of the frame, a delay b of the frame, the absence and/or presence of a transition referenced c (k corresponds to the index of an end of a voicing zone).

For this purpose, it is possible to use a variable length code, of which an example is given in the following Table I, to encode the correction to be made to each of the voicing transitions for each of the recognized segments. Since all the segments do not have a voicing transition, it is possible to reduce the bit rate associated with the voicing by encoding only the voicing transitions existing in the voicing to be encoded and in the best representatives.

According to this method, the voicing information is encoded on about 22 bits per second.

TABLE 1

Exemplary encoding table for voicing transitions

| Code | Interpretation |
|---|---|
| 000 | Transition to be eliminated |
| 001 | 1-frame shift to the right |
| 010 | 1-frame shift to the left |
| 011 | 2-frame shift to the right |
| 100 | 2-frame shift to the left |
| 101 | Insert a transition (a code specifying the location of the transition follows this one) |
| 110 | No shift |
| 111 | Shift greater than 3 frames (another code follows this) |

For a piece of combined voicing information such as:

the subband voicing rate, the analysis of this information uses a method described for example in the following document: D. W. Griffin and J. S. Lim, "Multiband excitation vocoders", IEEE Trans. on Acoustics, Speech and Signal Processing, Vol. 36, No. 8, pp. 1223–1235, 1988;

the transition frequency between a voiced baseband and a non-voiced high band, the encoding uses a method such as the one described in C. Laflamme, R. Salami, R. Matmti and J. P. Adoul, "Harmonic Stochastic Excitation (HSX) Speech Coding Below 4 kbit/s", *IEEE International Conference on Acoustics, Speech, and Signal Processing*, Atlanta, May 1996, pp. 204–207.

In both these cases, the encoding of the voicing information also comprises the encoding of the variation in the proportion of voicing.

Decoding of the Voicing Information

The decoder has voicing information of the "aligned best representatives" obtained from the encoder.

The correction is done for example as follows:

At each detection of the end of a voicing zone on the best representatives chosen for the synthesis, the method provides an additional piece of information to the decoder which is the correction to be made to this end. The correction may be an advance a or a delay b to be made to this end. This temporal shift is, for example, expressed in numbers of frames in order to obtain the exact position of the end of voicing of the original speech signal. The correction may also take the form of an elimination or an insertion of a transition.

Encoding of the Pitch

Experience shows that, on speech recordings, the number of voiced zones obtained per second is in the range of 3 or 4. To faithfully account for variations in pitch, one method consists in transmitting several pitch values per voiced zone. In order to limit the bit rate, instead of transmitting the entire succession of pitch values on a voiced zone, the contour of the pitch is approximated by a succession of linear segments.

Encoding of the Pitch

For each voiced zone of the speech signal, the method comprises a step of searching for the values of the pitch to be transmitted. The values of pitch at the beginning and at the end of the voiced zone are routinely transmitted. The other values to be transmitted are determined as follows:

the method considers solely the values of the pitch at the beginning of the recognized segments. Starting from the straight line Di joining the values of the pitch at the two ends of the voiced zone, the method searches for the start of the segment for which the pitch value is at the greatest distance from this straight line, which corresponds to a distance $d_{max}$. It compares this value $d_{max}$ with a threshold value $d_{threshold}$. If the distance $d_{max}$ is greater than $d_{threshold}$, the method breaks down the initial straight line Di into two straight lines $D_{i1}$ and $D_{i2}$ in taking the start of the segment found as the new pitch value to be transmitted. This operation is repeated on these two new voiced zones demarcated by the straight lines $D_{i1}$ and $D_{i2}$ until the distance $d_{max}$ found is smaller than the distance $d_{threshold}$.

To encode the values of the pitch thus determined, the method uses, for example, a predictive scalar quantifier on, for example, five bits applied to the logarithm of the pitch.

The prediction is for example the first pitch value of the best representative corresponding to the position of the pitch to be decoded, multiplied by a prediction factor ranging for example between 0 and 1.

According to another procedure, the prediction may be the minimum value of the speech recording to be encoded. In this case, the value may be transmitted to the decoder by scalar quantification, for example on 8 bits.

When the pitch values to be transmitted have been determined and encoded, the method comprises a step where the temporal spacing is specified, for example in terms of numbers of frames between each of these pitch values. A variable length code is used for example to encode these spacings on 2 bits on an average.

This procedure gives a bit rate of about 65/bits per second for a maximum distance, on the pitch period, of 7 samples.

Decoding of the Pitch

The decoding step comprises first of all a step for the decoding for the temporal spacing between the different pitch values transmitted in order to retrieve the instants of updating of the pitch as well as the value of the pitch for each of these instants. The value of the pitch for each of the frames of the voiced zone is reconstituted for example by linear interpolation between the transmitted values.

What is claimed is:

1. A speech coding method, comprising:

a learning step including, learning representatives from a first speech signal, each representative stored in a database as part of a set of one or more representatives that represent a class of acoustic units, each class of acoustic units based on a statistical model and not based on predetermined phonemes or words;

an encoding step including, segmenting a second speech signal, determining recognized segments of the second speech signal, each recognized segment including a portion of the second speech signal that corresponds to at least one of the representatives stored in the database, determining respective best representatives of at least one prosody parameter of the recognized segments, each best representative chosen, from among the representatives of the same class of acoustic units, as the representative that best approximates the at least one prosody parameter of the respective recognized segment, and encoding the second speech signal, at a bit rate of less than 800 bits/s, by encoding at least a first best representative of the at least one prosody parameter of a respective first recognized segment and by encoding a difference between the at least one prosody parameter of the first best representative and the at least one prosody parameter of the first recognized segment;

encoding a temporal alignment of the best representatives by using a dynamic time warping (DTW) path; and searching for a nearest neighbor in a table of shapes.

2. A method according to claim 1, wherein the at least one prosody parameter is an energy, voicing, length, or pitch of the first recognized speech segment and the first best representative.

3. A method according to claim 2, wherein the encoding of the difference between the at least one prosody parameter of the first best representative and the first recognized segment comprises a length encoding step, the length encoding step including:

encoding a difference in length between a length of the first recognized segment and a length of the first best representative; and multiplying the difference in length by a given factor.

4. A method according to claim 2, wherein the encoding of the difference between the at least one prosody parameter of the first best representative and the first recognized segment comprises an energy encoding step, the energy encoding step including:

determining a difference $\Delta E(j)$ between an energy value $E_{rd}(j)$ of a start of the first best representative and an energy value $E_{sd}(j)$ of a start of the first recognized segment.

5. A method according to claim 4, wherein the method further comprises an energy decoding step, the energy decoding step including:

translating an energy contour of the first best representative by difference $\Delta E(j)$ to make the energy value $E_{rd}(j)$ of the start of the first best representative coincide with an energy value $E_{sd}(j)$ of the start of the first recognized segment; and modifying the slope of the energy contour of the first best representative to make a last energy value $E_{rd}(j)$ of the first best representative coincide with an energy value $E_{sd}(j+1)$ of a start of a recognized segment having an index j+1.

6. A method according to claim 2, wherein the encoding of the difference between the at least one prosody parameter of the first best representative and the first recognized segment comprises a voicing encoding step, the voicing encoding step including:

determining a difference $\Delta T_k$, for an end of a voicing zone with an index k, between voicing curves of the first recognized segment and the first best representative.

7. A method according to claim 6, wherein the method further comprises a voicing decoding step, the voicing decoding step including:

correcting, for the end of the voicing zone with an index k, a temporal position of the end by the value $\Delta T_k$; or eliminating or inserting a transition.

8. A method according to claim 1, wherein the encoding of the second speech signal is performed at a bit rate of lower than 400 bits/s.

9. A method according to claim 1, wherein the encoding of the difference between the at least one prosody parameter of the first best representative and the first recognized segment comprises a pitch encoding step, the pitch encoding step including:

(a) estimating a pitch contour of a voiced zone by forming straight line $D_i$ from a pitch value at a start of a first recognized segment to a pitch value at a start of a next recognized segment;

(b) determining a greatest distance $d_{max}$ from the straight line to the pitch contour;

(c) comparing the greatest distance $d_{max}$ against a predetermined threshold distance $d_{threshold}$; and (d) when the greatest distance $d_{max}$ is greater than the predetermined threshold distance $d_{threshold}$, dividing the voiced zone into a first voiced zone extending from the start of the first recognized segment to the pitch value defining the greatest distance $d_{max}$ and a second voiced zone extending from the pitch value defining the greatest distance $d_{max}$ to the start of the next recognized segment.

10. A system for coding a speech signal, comprising:

an encoder including, a unit configured to learn representatives from a first speech signal, each representative stored in a database as part of a set of one or more representatives that represent a class of acoustic units, each class of acoustic units based on a statistical model and not based on predetermined phonemes or words, a unit adapted to segment a second speech signal, a unit configured to determine recognized segments of the second speech signal, each recognized segment including a portion of the second speech signal that corresponds to at least one of the representatives stored in the database, a unit adapted to determine respective best representatives of at least one prosody parameter of the recognized segments, each best representative chosen, from among the representatives of the same class of acoustic units, as the representative that best approximates the at least one prosody parameter of the respective recognized segment, and a unit adapted to encode the second speech signal, at a bit rate of less than 800 bits/s, by encoding a first best representative of the at least one prosody parameter of a respective first recognized segment and by encoding a difference between the at least one prosody parameter of the first best representative and the at least one prosody parameter of the first recognized segment; and at least one memory adapted to store the database of the representatives.

11. A system according to claim 10, further comprising:

a decoder, wherein the memory adapted to store the database of the representatives is common to both the encoder and the decoder of the coding system.

12. A system according to claim 10, wherein the encoder is adapted to encode the second speech signal at a bit rate of lower than 400 bits/s.

* * * * *